Patented May 26, 1936

2,042,011

UNITED STATES PATENT OFFICE 2,042,011

PRODUCING FLOCCULATION IN OIL WELL STRATA

Albert G. Loomis, Mount Lebanon Township, Allegheny County, Pa., assignor to Gulf Research & Development Corporation, Wilmington, Del., a corporation of Delaware No Drawing. Application December 6, 1934, Serial No. 756,361

8 Claims. (Cl. 166—21)

This invention relates to producing flocculation in oil well strata; and it comprises a method of differentially shutting off access of water to an oil well with retention of the oil flow wherein there is forced into the well under pressure an aqueous suspension of a fine grained flocculating solid, the suspension containing no substantial amounts of dissolved electrolyte and introduction being continued until the suspension has penetrated a substantial distance into the pervious strata, driving the contained saline liquid ahead of it, and the pressure is then released, whereby flocculation of the suspensoid occurs, with plugging of the pores, by diffusion of the brine; all as more fully hereinafter set forth and as claimed.

In oil wells, it is frequently desirable to shut off inflow of water from the wet formations through which the well passes, without interfering with inflow of oil; it is desirable to plug the wet pores without interfering with the oil-filled pores. No really satisfactory way of accomplishing this is in use. Casing off the well, using mud suspensions, concrete blocks, etc., shut off everything; they are indiscriminate. A method of preferentially plugging off wet pores forms the subject of the present invention.

Considering the exposed surfaces of the strata through which the well passes as a filtering face, it is apparent that no coarse grained mud can be forced into it for any substantial distance, whatever the pressure used, and that upon release of the pressure the plugging ceases. Finer grained suspensions which will enter a filtering face for some distance will ultimately accumulate and produce a temporary plugging, but upon release of the pressure, the back pressure of the water, or of the oil, as the case may be, will dislodge accumulations.

In the present inventions are used fine grained sols, using the word "sol" to express a dispersion of a solid of colloidal fineness, with the contained suspended material of such a character that it is flocculated by contact with an electrolyte. This flocculation represents a coming together of finer particles to form coarser, wet bodies, or flocs, capable of effectively plugging pores and not dislodged by back pressure. The farther into the formation the sol penetrates before flocculation, the better, since the pressure drop is less than at the face of the bore.

In the majority of cases, the aqueous liquids in the wet formations are brines containing NaCl and, frequently, $CaCl_2$ or $MgCl_2$, either or both. These saline liquids are effective flocculating agents for sols which depend upon the absence of an electrolyte. There are many such sols available for the present purposes, but one of the best is ferric oxid. Such a sol may be obtained by dialyzing a solution of ferric chlorid to which a base has been added to a point short of precipitation. Dialysis may be as usual with a flowing stream of water separated from the liquid by pervious membrane, parchment paper, etc.

A more direct and generally more convenient way is to start with a solution of ferric chlorid, which can be of ordinary commercial grade, and neutralize it slowly with ammonium hydroxid (ammonia water), with constant agitation to dissolve the precipitate of ferric hydroxid which forms momentarily. In this method, ferric chlorid is present in excess throughout and acts as a peptizing agent. When all the ferric chlorid is neutralized by the ammonia, it is necessary to add a little more ferric chlorid to peptize the last precipitate that forms; the exact amount to be added being determined by the amount of ammonia added.

The solution can then be dialyzed if desired, though this is not necessary. The solution, upon merely standing quiet for a few hours, develops into a perfectly clear, deep red sol. The sol can be diluted considerably with fresh water without any precipitation, but on contact with saline waters, such as those occurring in oil wells, a voluminous clotting floc is formed. Such a sol, when forced into the porous strata through which the well passes, is coagulated by backward diffusion of saline liquids forced ahead of it. The precipitate at first formed swells by imbibition of water, improving its action as a plugging agent.

In the oil-filled pores, nothing happens; upon release of the imposed pressure, the oil renews its flow into the well, simply displacing the aqueous sol.

Another satisfactory method of making a ferric oxid sol is to precipitate ferric hydroxid with ammonia, or sodium or ammonium carbonate, carefully wash the precipitate until it is fairly free of chlorids, then digest the precipitate with concentrated ferric chlorid solution and dialyze in the usual manner. This procedure likewise gives a clear, deep red sol which produces a voluminous precipitate on contact with saline waters.

Instead of the ferric oxid sol, which is considered particularly advantageous for the present purposes, not only on account of its relative cheapness, but also for certain other reasons, there may be employed a wide variety of other aqueous suspensions or sols. It is possible to use any sol which gives a clotting precipitate on contact with salines. Aqueous suspensions of sulfur, relatively free of electrolytes, may be made in many ways, as by the interaction of $H_2S$ and $SO_2$ and these are available for the present purposes. A variety of colloidal suspensions of sulfids may be employed; those of arsenic, antimony, bismuth, tin, lead, copper, zinc, cadmium, mercury, iron, nickel, cobalt or manganese. Some of these sols are not particularly stable in the air, but in the well, where oxygen is absent, they can be used freely. Many salts and hydrated metallic oxids are also useful in the form of sols; in the form of suspensions relatively free of electrolyte and having suspended particles of ultramicroscopic size; showing the Tyndall effect. Sometimes, as in the case of one of the ferric oxid sols described, the sol may be stabilized by the presence of a small amount of a peptizing agent.

The presence in a ferric sol of a slight excess of ferric chlorid makes the sol somewhat less sensitive to salines and is sometimes advantageous, since it allows the sol to penetrate farther into the formation before deposition.

As an example of the preparation and use of one of these sols, a sol of aluminum oxid can be made by peptizing freshly precipitated and washed aluminum hydroxid with a little acetic acid; an amount just sufficient to cause the precipitate to dissolve. The solution is diluted and boiled to remove excess acid. The resulting sol can be used in well treatment in the manner described. On contact with salines, a dense precipitate of alumina is thrown out. It is advantageous to leave in the sol a little excess of the peptizing agent. This stabilizes the sol and allows it to penetrate farther into the formation before precipitation occurs. Hydrochloric acid can be used instead of acetic. The amount of hydrochloric acid required for complete peptization depends on the history of the aluminum hydroxid, but is in all cases much less than that which would be required to convert the aluminum hydroxid into aluminum chlorid. Usually, one-tenth of an equivalent weight of hydrochloric acid suffices.

Chromic oxid sols, that is, those containing $Cr_2O_3$, may be made and used in a similar way. They are somewhat more expensive than the iron oxid and aluminum sols, but are quite efficient. They are more sensitive to saline solutions, however.

Another way to prepare an alumina sol is analogous to one used in preparing ferric oxid sol. Freshly precipitated and washed aluminum hydroxid is peptized in a solution of aluminum chlorid and excess peptizing agent is dialyzed out.

In practice, I advantageously prepare the ferric oxid and aluminum oxid sols by the direct peptization methods described, rather than the dialysis methods, for the sake of economy.

In making silica sols, dialysis is usually necessary. Water glass in amount two-thirds that necessary for immediate gelatinization can be added to hydrochloric acid of 10 per cent strength. The mixture is then dialyzed to produce a silica sol. The sol can be used in well treatment in the procedure described. On contact with salines a heavy precipitate of hydrated silica occurs.

Suspensions containing particles gross enough to permit filtering by ordinary filtering materials are generally inapplicable for my purposes, but I regard my invention as covering any fine grained suspension substantially free of electrolytes and capable of being forced backward into the well formations for a suitable distance under pressure and of being there coagulated by saline liquids. In other words, I use a filtrable liquid which can be passed into and through the capillaries of the wall face without being filtered out and which will, at some point within the formation, be converted into a comparatively coarse grained material which will not pass through the capillaries; which is filtered out.

In a specific embodiment of the present invention treating a well with inflowing oil and inflowing brines at one or more levels, the well is first freed of salt water by circulating dry oil down the casing under heavy pressure, thereby forcing the brine of the well up the tube. Sometimes a powerful oil pump is required to overcome the formation pressure, while sometimes the hydrostatic head of the column of the dry oil is sufficient to preclude inflow. In any event, after the brine has been displaced, fresh water, free of salines, is pumped in to push the brine back some distance in the formation and, so to speak, wash the walls of the pores. The water is followed by a flow of sol under pressure. After the sol has been forced back a sufficient distance, usually several feet, there is a pause to allow diffusion of the brine into the well, with resultant plugging. On now releasing the pressure in the well, the sol which is in the oil formation is simply pushed back into the well, while the sol in the wet pores is flocculated and the pores effectively plugged.

The sol used in this instance contained about 1.3 ounces of ferric oxid per gallon; and was made by neutralizing a ferric chlorid solution, made from commercial ferric chlorid with sodium carbonate until the solution was free of iron. The precipitate was then filterpressed and carefully washed until fairly free of chlorids. The cake was then digested in a concentrated solution of ferric chlorid. The hydrated ferric oxid redissolved as a deep red sol permanent enough to handle and capable of standing dilution with fresh water, but flocculating readily on introduction of any substantial amount of saline matter. In this particular instance because of proportions used the sol was not highly sensitive to saline matter. This was advantageous as allowing a deeper penetration of the sol into the formation prior to flocculation or coagulation. Some measure of delayed action of this type is desirable.

While, as stated, other fine grained sols free of electrolyte and capable of flocculation by diffusion of electrolyte thereinto are applicable for the present purposes, sols of the three sesquioxids mentioned, ferric oxid, aluminum oxid and chromium oxid, are regarded as most generally available.

What I claim is:—

1. A method of differentially shutting off water in an oil well penetrating pervious formations carrying oil and saline water which comprises forcing into the well under pressure a supply of an aqeous fine grained inorganic sol capable of flocculation on contact with electrolytes, said sol being substantially free of electrolytes and being substantially free of particles coarse enough to be filtered out in capillary passages, continuing the pressure and the supply until the sol penetrates a substantial distance into the pervious formations and permitting the sol so penetrating to undergo flocculation in situ by diffusion of saline matter thereinto.

2. A method of differentially shutting off water in an oil well penetrating pervious formations carrying oil and saline water wherein saline water standing in the well is displaced therefrom with dry oil forced down the well under pressure, fresh non-saline water is injected into the well under pressure sufficient to cause a penetration of the pervious formations, thereby forcing the contained saline water backward into the formation, an aqueous fine grained suspension of a solid capable of undergoing flocculation by contact with salines, said suspension being substantially free of electrolytes, is injected into the well under pressure for a time sufficient to enable penetration of the formation by the suspension for a substantial distance and flocculation of the solid in the suspension is permitted to take place by diffusion of saline matter thereinto, said flocculation plugging the pores.

3. The matter of claim 1 wherein the suspension contains a sesquioxid sol.

4. The matter of claim 1 wherein the suspension comprises ferric oxid sol.

5. The matter of claim 1 wherein the suspension comprises aluminum oxid sol.

6. The matter of claim 1 wherein the suspension comprises silica sol.

7. The matter of claim 1 wherein the suspension comprises a sol with a slight excess of peptizing agent so as to allow the suspension to penetrate far into the water formation before flocculation occurs.

8. A process of selectively shutting off water from an oil well penetrating formations bearing oil and saline water which comprises displacing with oil saline water standing in the well, forcing saline water existing in the water formation back into the water formation with fresh water and injecting into the water formation under pressure a liquid suspension of a material capable of forming a water insoluble clogging deposit upon intermingling with the saline water in the water formation.

ALBERT G. LOOMIS.